(12) United States Patent
Sun et al.

(10) Patent No.: US 9,283,670 B2
(45) Date of Patent: Mar. 15, 2016

(54) ROBOT CLEANER

(71) Applicant: LG ELECTRONICS INC., Seoul (KR)

(72) Inventors: Changwha Sun, Seoul (KR);
Dongmyung Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 14/035,109

(22) Filed: Sep. 24, 2013

(65) Prior Publication Data

US 2014/0257564 A1  Sep. 11, 2014

(30) Foreign Application Priority Data

Mar. 5, 2013  (KR) .......................... 10-2013-0023564

(51) Int. Cl.
*A47L 11/00* (2006.01)
*B25J 9/00* (2006.01)
*G05D 1/02* (2006.01)

(52) U.S. Cl.
CPC .............. *B25J 9/0003* (2013.01); *G05D 1/024* (2013.01); *A47L 2201/04* (2013.01); *G05D 2201/0203* (2013.01); *G05D 2201/0215* (2013.01); *Y10S 901/01* (2013.01); *Y10S 901/47* (2013.01)

(58) Field of Classification Search
CPC ... G05D 1/0231; G05D 1/024; G05D 1/0242; G05D 2201/0203; G05D 2201/0215; B25J 9/0003; Y10S 901/01; Y10S 901/47; A47L 2201/00; A47L 2201/04
See application file for complete search history.

(56) References Cited

U.S. PATENT DOCUMENTS

| | | | |
|---|---|---|---|
| 2004/0199301 A1* | 10/2004 | Woo et al. | 701/1 |
| 2005/0166354 A1 | 8/2005 | Uehigashi | |
| 2007/0100501 A1* | 5/2007 | Im et al. | 700/259 |

FOREIGN PATENT DOCUMENTS

| | | |
|---|---|---|
| CN | 1955839 A | 5/2007 |
| CN | 101194813 A | 6/2008 |
| CN | 101297267 A | 10/2008 |
| CN | 101983609 A | 3/2011 |
| DE | 102011053975 A1 | 4/2012 |
| EP | 1441271 B1 | 3/2011 |
| EP | 2672287 A1 | 12/2013 |
| JP | 2009056217 A | 3/2009 |
| KR | 10-2002-0038296 A | 5/2002 |
| KR | 1020040003555 A | 1/2004 |
| KR | 10-2004-0067463 A | 7/2004 |
| KR | 10-0738888 B1 | 7/2007 |
| KR | 10-2011-0124506 A | 11/2011 |

\* cited by examiner

*Primary Examiner* — Spencer Patton
(74) *Attorney, Agent, or Firm* — Dentons US

(57) ABSTRACT

A robot cleaner includes a main body, a light transmitting unit, an image sensor, a base, a rotation drive unit, and an elevation drive unit. The light transmitting unit emits light. The light reflected or scattered by an obstacle is sensed by the image sensor. The base supports the light transmitting unit and the image sensor and is rotatably and vertically movably disposed in the main body. The rotation drive unit rotates the base. The elevation drive unit allows the base to retract or protract from the main body.

22 Claims, 13 Drawing Sheets

ROBOT CLEANER

This application claims priority to Korean Patent application No. 10-2013-0023564 filed Mar. 5, 2013, which is hereby incorporated by reference.

BACKGROUND

1. Field of the Disclosure

The present disclosure relates to a robot cleaner.

2. Description of the Related Art

A robot cleaner is an apparatus that automatically cleans a target area without a user's manipulation by traveling on its own accord and suctioning foreign substances such as dust from the floor.

Generally, robot cleaners sense distances from obstacles such as furniture, office fixtures and walls within a target area to be cleaned, and avoid those obstacles by mapping the target area and controlling the driving of its left wheel and right wheel. In a related art, the traveling distance of the robot cleaner is measured by a controller using sensors to observe a ceiling or floor, and the distance from an obstacle is calculated based on those observation. However, since this method adopts indirectly estimating the distance from the obstacle based on the traveling distance of the robot cleaner, when the traveling distance of the robot cleaner is not accurately measured due to unevenness of the floor, for example, a distance error from the obstacle inevitably occurs. Particularly, the distance measurement method mainly used in such robot cleaners uses infrared rays or ultrasonic waves. Thus, when the obstacle scatters much of the infrared rays or ultrasonic waves, a significant error may occur in the distance measurement.

Also, protruding obstacles such as thresholds and obstacles such as desks or beds having a certain space thereunder are three-dimensionally disposed in the area to be cleaned, but typical robot cleaners cannot recognize such obstacle situations.

SUMMARY

Thus, one object is to provide a robot cleaner which can accurately recognize the obstacle situation in an area to be cleaned.

According to one aspect, there is provided a robot cleaner including: a main body; a light transmitting unit emitting light; an image sensor that senses the light emitted from the light transmitting unit and reflected or scattered by an obstacle; a base supporting the light transmitting unit and the image sensor and rotatably and vertically movably disposed in the main body; a rotation drive unit for rotating the base; and an elevation drive unit allowing the base to retract and protract from the main body.

According to another aspect, there is provided a robot cleaner including: a main body; a location sensor rotatably and vertically movably disposed in the main body to sense a location of an obstacle by emitting light to the obstacle; a rotation drive unit rotating the location sensor; and an elevation drive unit allowing the location sensor to rise and fall.

The foregoing and other objects, features, aspects and advantages will become more apparent from the following detailed description when taken in conjunction with the accompanying drawings.

BRIEF DESCRIPTION OF THE DRAWINGS

Embodiments will be described in detail with reference to the following drawings in which like reference numerals refer to like elements, and wherein.

DETAILED DESCRIPTION OF THE PREFERRED EMBODIMENTS

Figure 1:
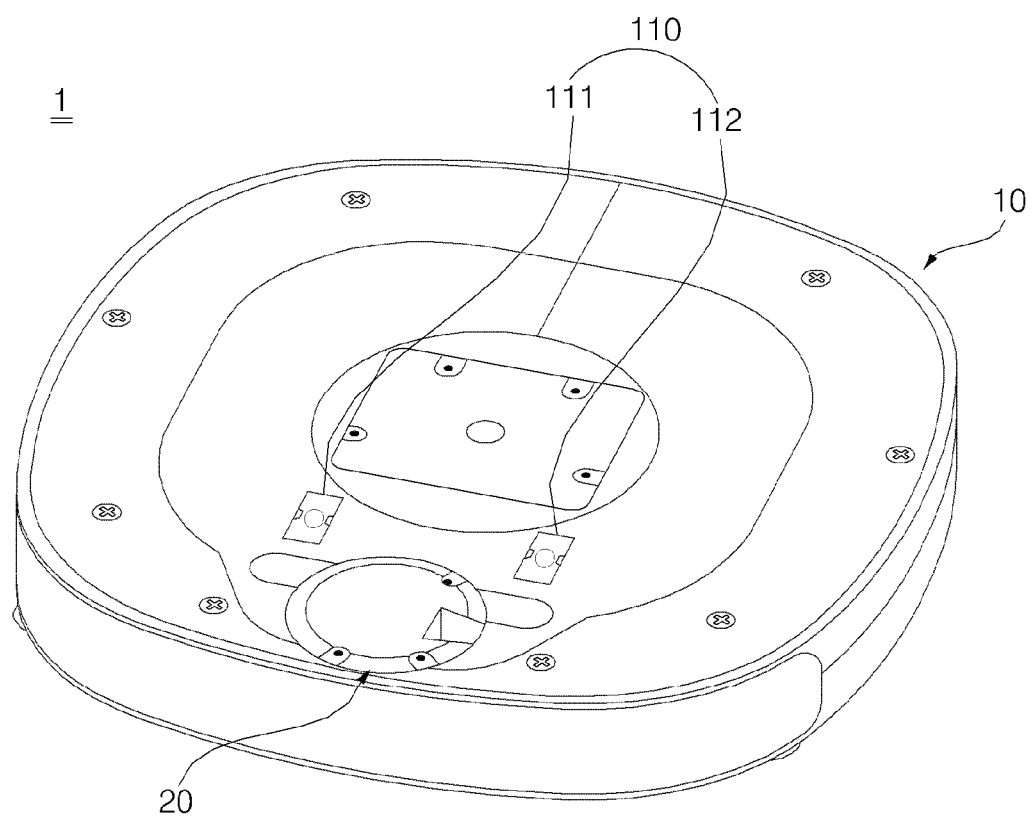
FIG. 1 is a perspective view illustrating a robot cleaner according to an embodiment of the present invention.

The foregoing and other objects, features, aspects and advantages will become more apparent from the following detailed description when taken in conjunction with the accompanying drawings. Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete to those skilled in the art. In the drawings, the shapes and dimensions may be exaggerated for clarity, and the same reference numerals will be used throughout to designate the same or like components.

Figure 2:
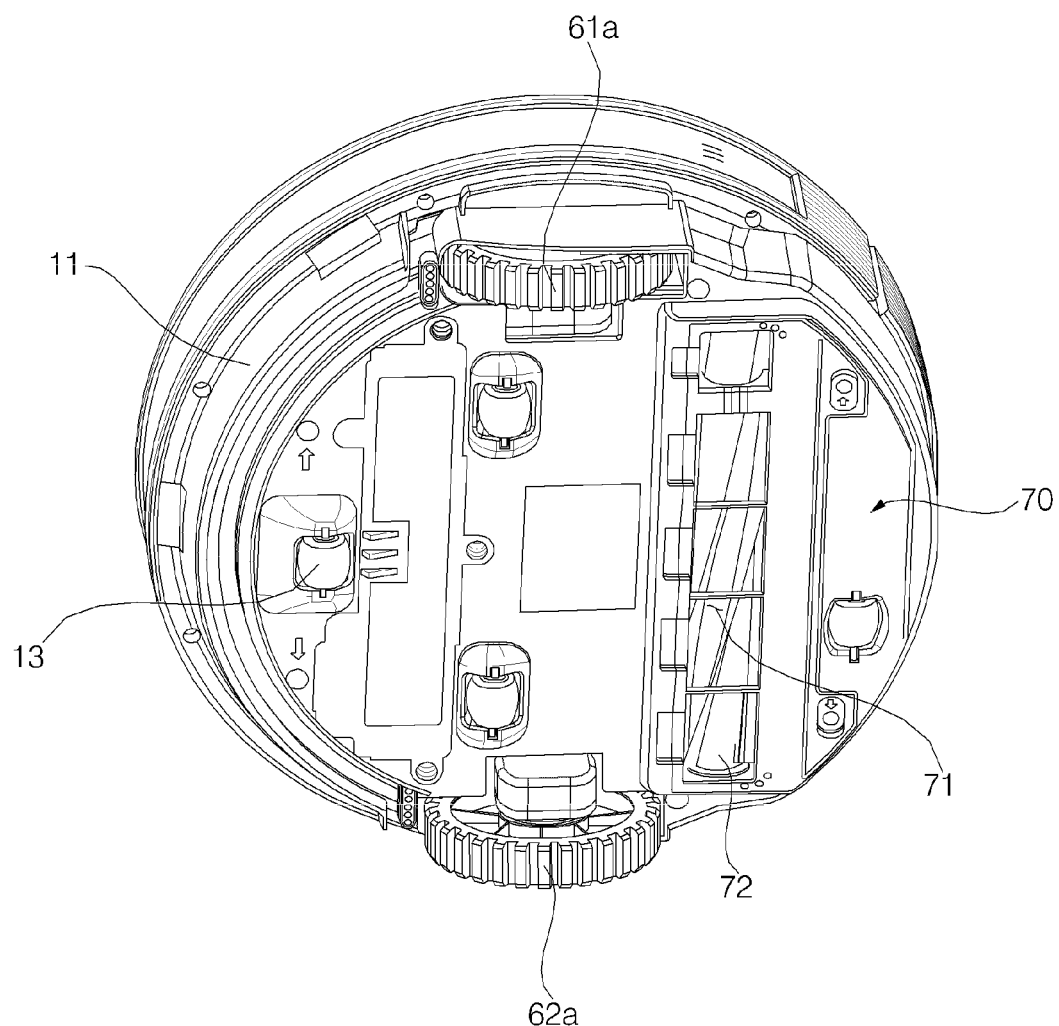
FIG. 2 is a view illustrating an undersurface of the robot cleaner of FIG. 1.
Figure 3:
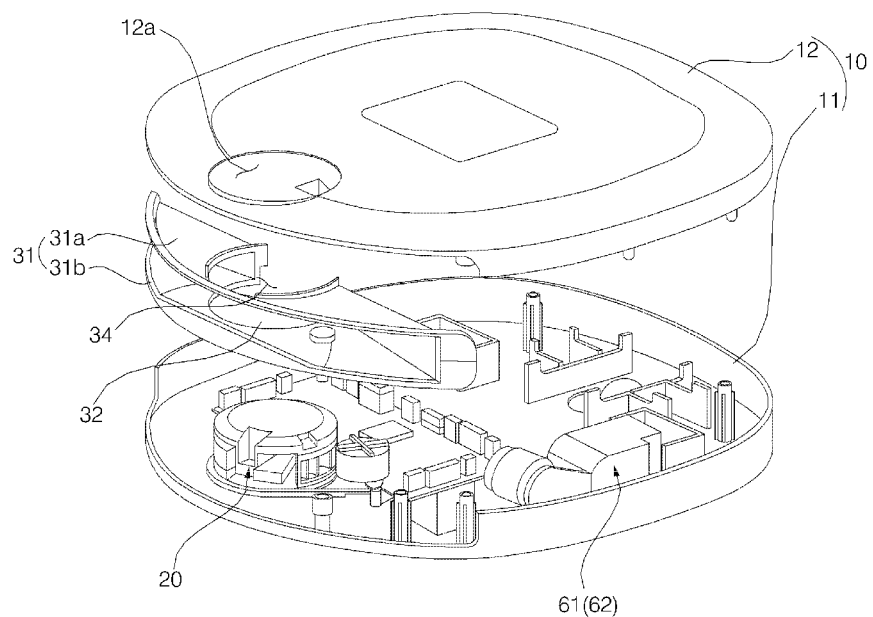
FIG. 3 is an exploded perspective view illustrating the robot cleaner of FIG. 1.
Figure 4:
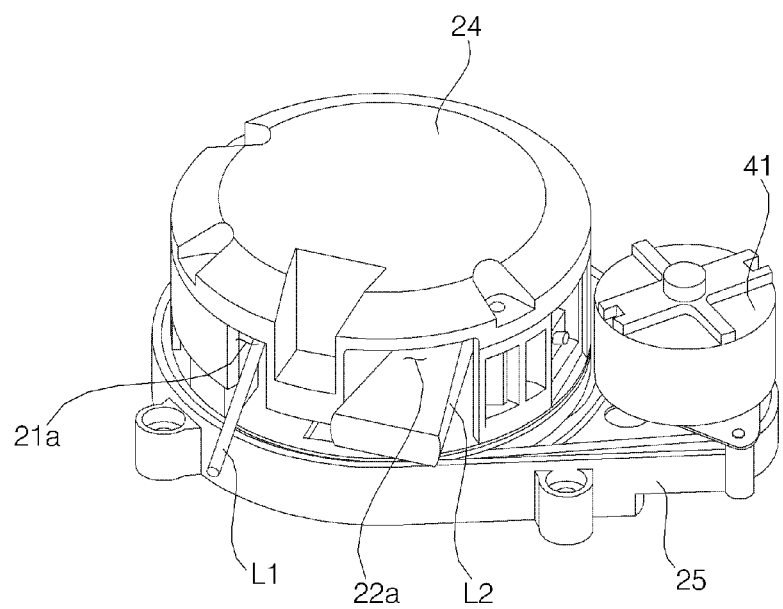
FIG. 4 is a view illustrating a location sensor of FIG. 3.
Figure 5:
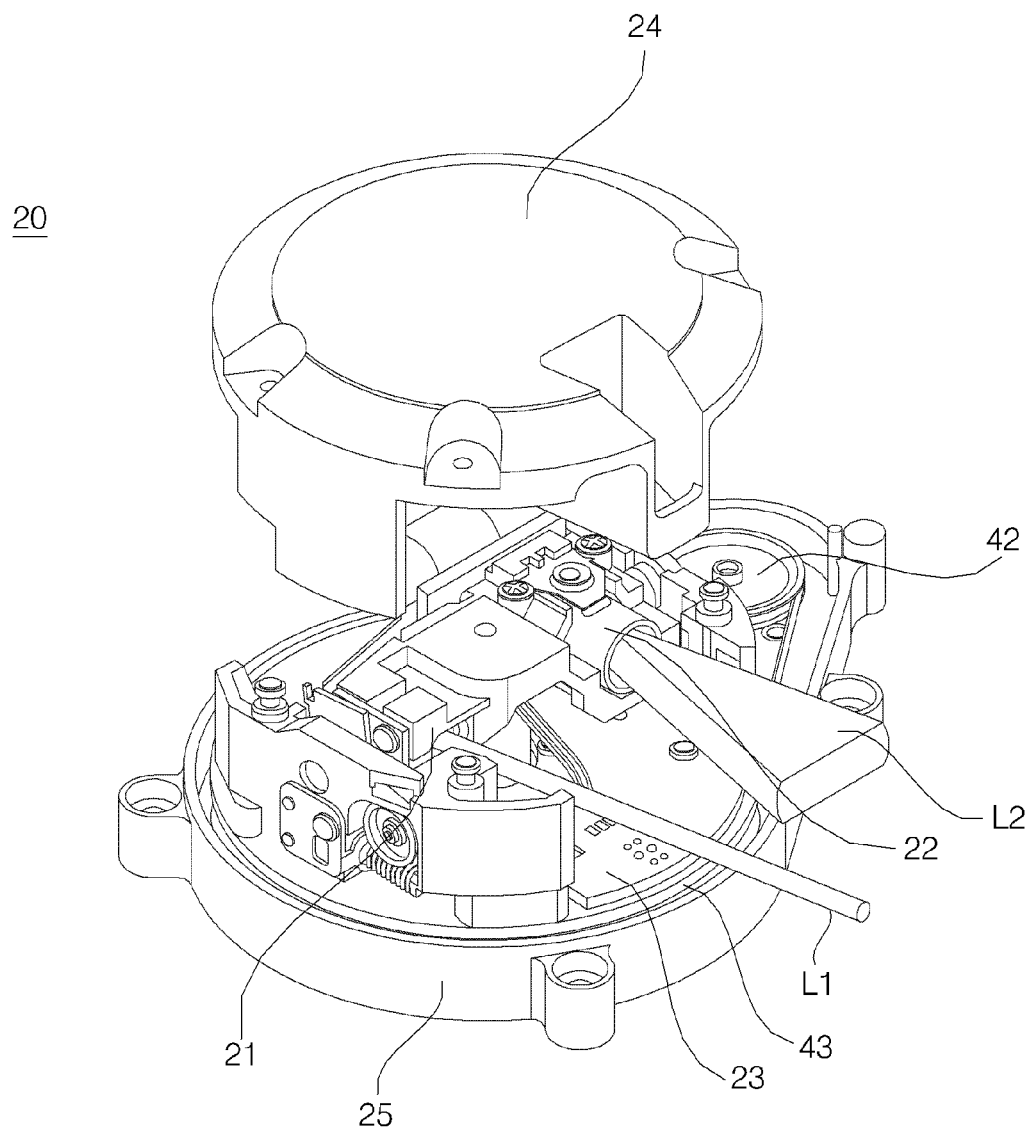
FIG. 5 is an exploded perspective view illustrating the location sensor of FIG. 4.

FIG. 1 is a perspective view illustrating a robot cleaner according to an embodiment of the present invention. FIG. 2 is a view illustrating an undersurface of the robot cleaner of FIG. 1. FIG. 3 is an exploded perspective view illustrating the robot cleaner of FIG. 1. FIG. 4 is a view illustrating a location sensor of FIG. 3. FIG. 5 is an exploded perspective view illustrating the location sensor of FIG. 4. FIG. 6 is a view illustrating a retracted location of the location sensor and FIG. 6B is a view illustrating a protracted location of the location sensor, respectively. FIG. 7 is a view illustrating a control relationship among main units of a robot cleaner according to an embodiment of the present invention.

Referring to FIGS. 1 to 7, a robot cleaner 1 according to an embodiment of the present invention may include a main body 10, a location sensor 20, a rotation drive unit 40, an elevation drive unit 50, and a controller 90.

While a left wheel 61a and a right wheel 62a of the main body 10 are rotating, the main body 10 may travel around an area (hereinafter, referred to as "cleaning area") to be cleaned to suction foreign substances such as dust or garbage through a suctioning unit 70.

The suctioning unit 70 may include a suctioning fan 72 disposed in the main body 10 to generate a suctioning force and a suctioning inlet 71 for suctioning air flow generated by the rotation of the suctioning fan 72. Also, the suctioning unit 70 may further include a filter (not shown) for filtering foreign substances among air suctioned through the suctioning inlet 71 and a foreign substance container (not shown) for collecting foreign substances filtered by the filter.

The robot cleaner 1 may further include a traveling drive unit 60 for driving the left wheel 61a and the right wheel 62a, and may further include a left wheel drive unit 61 for driving the left wheel and a right wheel drive unit 62 (reference number 62 of FIG. 3 indicates the right wheel drive unit disposed at the opposite side of the left wheel drive unit 61) for driving the right wheel 62a. Since the operation of the left wheel drive unit 61 and the right wheel drive unit 62 is independently controlled by the controller 90, the main body 10 may move forward and backward or turn around. For example, when the left wheel 61a is rotated in the forward direction by the left wheel drive unit 61 and the right wheel 62a is rotated in the backward direction by the right wheel drive unit 62, the main body may turn to right. The controller 90 may control the rotational speed of the left wheel drive unit 61 and the right wheel drive unit 62 to differ from each other. Thus, the translational motion of the main body 10 that can perform both rectilinear motion and rotational motion can be induced. The motion of the main body 10 by the control of the controller 90 enables avoidance or turning with respect to obstacles. The robot cleaner 1 may further include at least one auxiliary wheel 13 to stably support the main body 10.

The main body 10 may include a lower body 11 that houses the rotation drive unit 40, the elevation drive unit 50, and the traveling drive unit 60, and an upper body 12 that covers the lower body 11. The location sensor 20 may retract and protract through an elevation aperture 12a formed in the upper body 12.

A transparent member 32 may be disposed on a path along which light emitted from a light-transmitting unit 21 of the location sensor 20 or light received in a light-receiving unit 23 travels. The transparent member 32 may be fixed on the main body 10. The main body 10 may have an opening at the front side thereof. The transparent member 32 may be fixed by a transparent member frame 31 installed in the opening.

The transparent member frame 31 may include a first frame member 31a and a second frame member 31b. The first frame member 31a and the second frame member 31b may have a coupling groove which the transparent member 32 is inserted into, respectively.

The transparent member frame 31 may have a receiving groove 34 concaved toward the transparent member 32 to surround the location sensor 20. The receiving groove 34 may be formed in at least one of the first frame member 31a and the second frame member 31b.

Figure 6A:
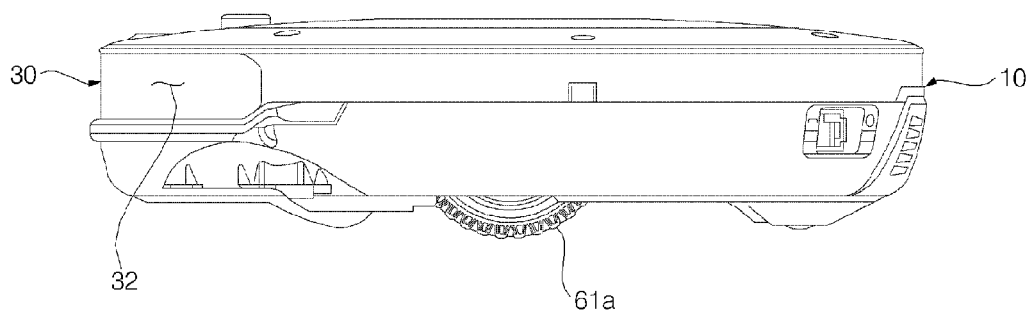
FIG. 6A is a view illustrating a retracted location of the location sensor and FIG. 6B is a view illustrating a protracted location of the location sensor, respectively, according to an embodiment of the invention.
Figure 6B:
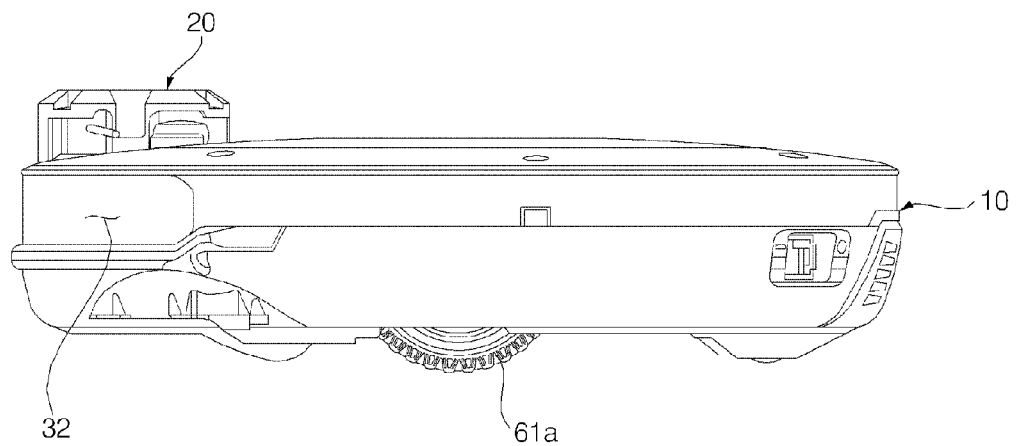
Figure 7:
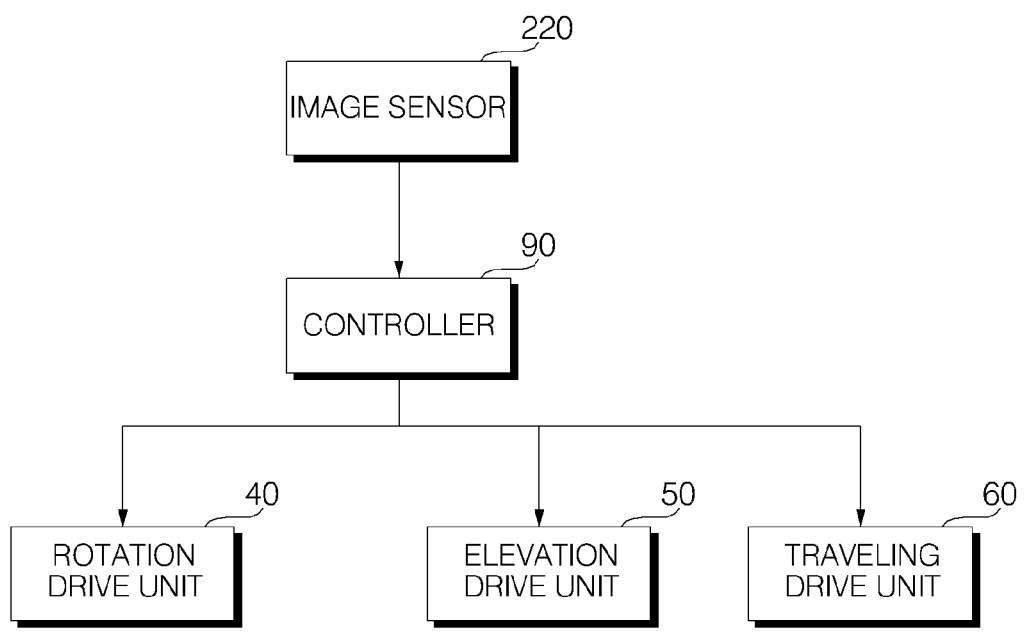
FIG. 7 is a view illustrating a control relationship among main units of a robot cleaner according to an embodiment of the present invention.

FIG. 6A illustrates the location sensor 20 that is at a retracted location. Light emitted from the light-transmitting unit 21 may travel toward the front side of the main body 10 through the transparent member 32 described later, and light reflected or scattered by obstacles may travel toward the transparent member 32 to be received by the light-receiving unit 22.

FIG. 6B illustrates the location sensor 20 that is at a protracted location. Here, the location sensor 20 may upwardly protrude from the main body 10 through the elevation aperture 12a, such that the light-transmitting unit 21 and the light-receiving unit 22 may be located at the upper side of the main body 10.

The location sensor 20 may sense the location or distance of obstacles by emitting light to the obstacles. The location sensor 20 may be rotatably and vertically movably disposed in the main body 10. The location sensor 20 may further include a base 23 in addition to the light-transmitting unit 21 and the light-receiving unit 22.

The light-transmitting unit 21 may include a light source that emits light and a collimate lens that refracts light (L1 of FIGS. 4 and 5) emitted from the light source so as to travel in parallel. The light source may include a light emitting element, e.g., an infrared or visible ray light emitting diode (LED) that emits infrared rays or visible rays. Preferably, the light source may be a light emitting element that emits a laser beam. In this embodiment, a laser diode (LD) 210 will be exemplified as the light source. Particularly, the light source 210 using a laser beam may enable accurate measurement compared to other lights due to the monochromatic, directionality, and collimation characteristics of a laser beam. For example, compared to laser beam, infrared rays or visible rays may vary in measurement accuracy according to the ambient environmental factors such as color or texture of a subject.

The light-receiving unit 22 may include an image sensor 220 on which a spot of light (L2 of FIGS. 4 and 5) reflected or scattered by obstacles is formed.

The image sensor 220 may be an assembly of a plurality of unit pixels that are arranged in a matrix form of m×n. The unit pixel may be implemented with various kinds of light receiving elements such as cadmium sulfide cell (CdS), photo diode, photo transistor, solar cell, and photoelectric tube. These light receiving elements may convert optical signals into electric signals. One example of an image sensor may be a complementary metal-oxide semiconductor (CMOS) sensor. Also, the light receiving unit 22 may include a light receiving lens 230. Light reflected or scattered by obstacles may travel through the light receiving lens 230 to form an image on the image sensor 220. The light receiving lens 230 may include a plurality of lenses.

The base 23 may support the light transmitting unit 21 and the light receiving unit 22, and may be rotatably and vertically movably disposed at the main body 10. The light transmitting unit 21 and the image sensor 220 may be disposed at certain interval from each other on the base 23.

Referring to FIGS. 4 and 5, the rotation drive unit 40, which rotates the base 23, may include a motor 41 for providing a torque and power transmission members such as belt and/or gear which deliver the torque of the motor 41 to rotate the base 23. The power transmission members are illustrated as including a pulley 42 connected to a shaft of the motor 41 and a belt 43 delivering the torque of the motor 41 between the pulley 42 and the base 23, but the present invention is not limited thereto.

Meanwhile, a supporter 25 may be further provided to support the location sensor 20. The base 23 may be rotatably supported by the supporter 25. The supporter 25 may be fixed on the lower body 11 by coupling members such as screw or bolt. In this case, the elevation drive unit 50 described later may allow the base 23 to retract and protract from the main body 10, but the present invention is not limited thereto. According to another embodiment, the supporter 25 may be vertically movable with respect to the lower body 11 by the elevation drive unit 50.

A base cover 24 may be coupled to the base 23, and may rotate together with the base 23. A light transmitting passage 21a through which light emitted from the light transmitting unit 21 passes and a light receiving passage 22a through which light received in the light receiving unit 22 passes may be formed between the base cover 24 and the base 23.

The elevation drive unit 50 may allow the location sensor 20 to retract and protract from the main body 10. The elevation drive unit 50 may include a linear or rotational motor (not shown). In order to allow the location sensor 20 to retract and protract, a power transmission unit may be provided to perform power transmission or conversion between the elevation drive unit 50 and the location sensor 20. The power transmission unit may be implemented with members such as gear, pulley, and/or belt. For example, when a rotational motor is used for the elevation drive unit 50, the power transmission unit may include a drive pinion rotated by the motor, and a rack is fixedly disposed in the base 23 to engage with the drive pinion.

The controller 90 may control the operation of the rotation drive unit 40 and the elevation drive unit 50. According to embodiments, the controller 90 may perform the control of components such as the light source 210, the image sensor 220, and the traveling drive unit 60, and/or other components constituting the robot cleaner 1. For example, the controller 90 may include a microprocessor that processes electric signals inputted from the image sensor 220. The controller 90 may include only one controller. However, the robot cleaner 1 may include a plurality of controllers for controlling each component. In this case, the controller 90 may be defined as a part or all of the plurality of controllers. The controllers need only to be electrically connected to each other in terms of transmission/reception of signals. The spatial disposition between the controllers may be irrelevant to the definition of the controller 90.

Figure 8:
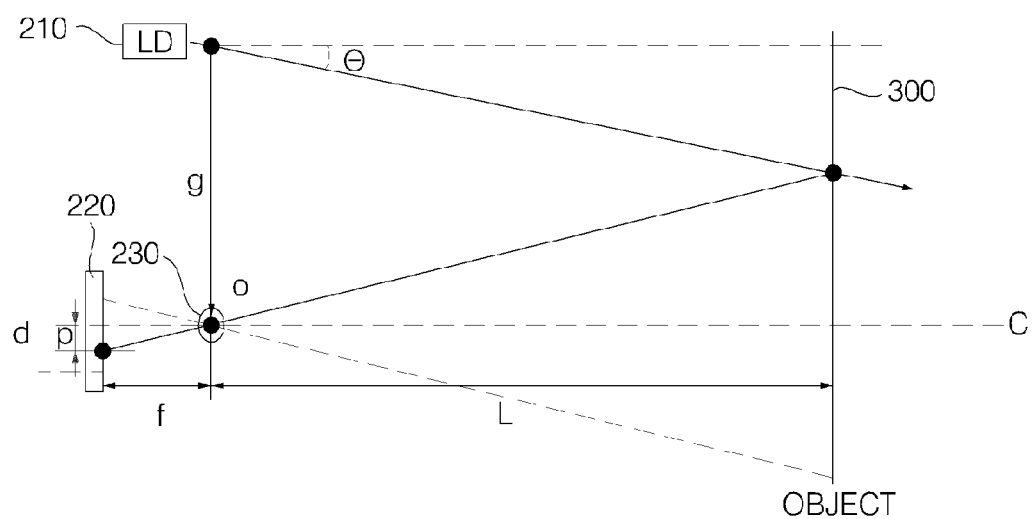
FIG. 8 is a view illustrating a principle of measuring a distance from an object.

FIG. 8 is a view illustrating a principle of measuring a distance from an object. Referring to FIG. 8, the basic principle of sensing the location of an object using the location sensor 20 may be based on a triangulation method.

Light emitted from the light source 210 may have a certain angle θ with respect to the main axis C that is orthogonal from the center surface of the light receiving lens 230. The angle θ may be closely related with the accuracy of the distance measurement from the object. If the angle θ is too small, it may be difficult to measure a distance from an object at a close range. On the other hand, if the angle θ is too large, it may be difficult to measure a distance from an object at a long range. Accordingly, the angle θ needs to have an appropriate value such that an object located at a range from about 0.1 m to about 4 m can be measured.

The image sensor 220 may be disposed such that it is spaced from the light source 210. The light receiving lens 230 may be disposed between the image sensor 220 and the object or obstacle 300. In this case, when a distance between the obstacle 300 and the light receiving lens 230 is defined as an object distance L, the object distance L can be expressed as Equation 1 below.

$$L = \frac{-fg}{p - f\tan\Theta} \quad (1)$$

Here, f is a focal length, g is an interval between the light source 210 and the light receiving lens 230, θ is an angle between light emitted from the light source 210 and the main axis C of the light receiving lens 230, and p is a length a center O of the image sensor 220 to a spot of the image sensor 220 where light reflected or scattered by the object is detected.

Figure 9A:
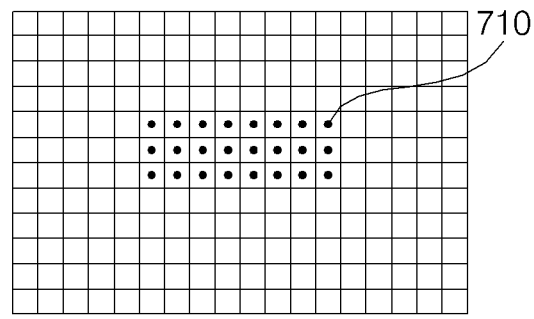
FIGS. 9A, 9B, and 9C are views illustrating three exemplary spot distributions formed on an image sensor of a location sensor.
Figure 9B:
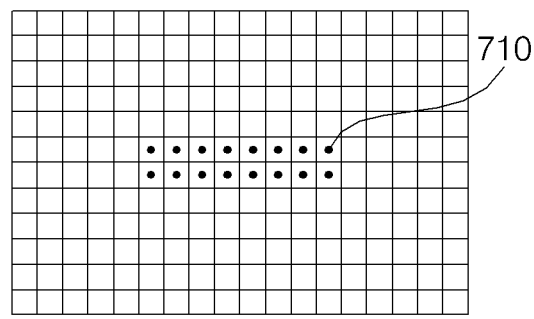
Figure 9C:
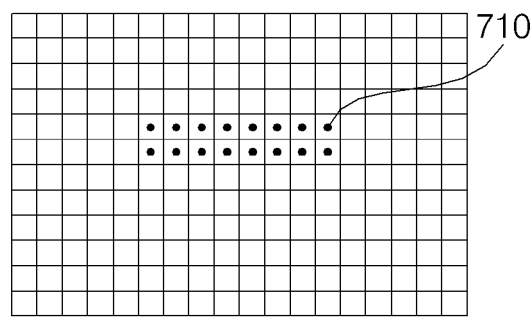
Figure 10:
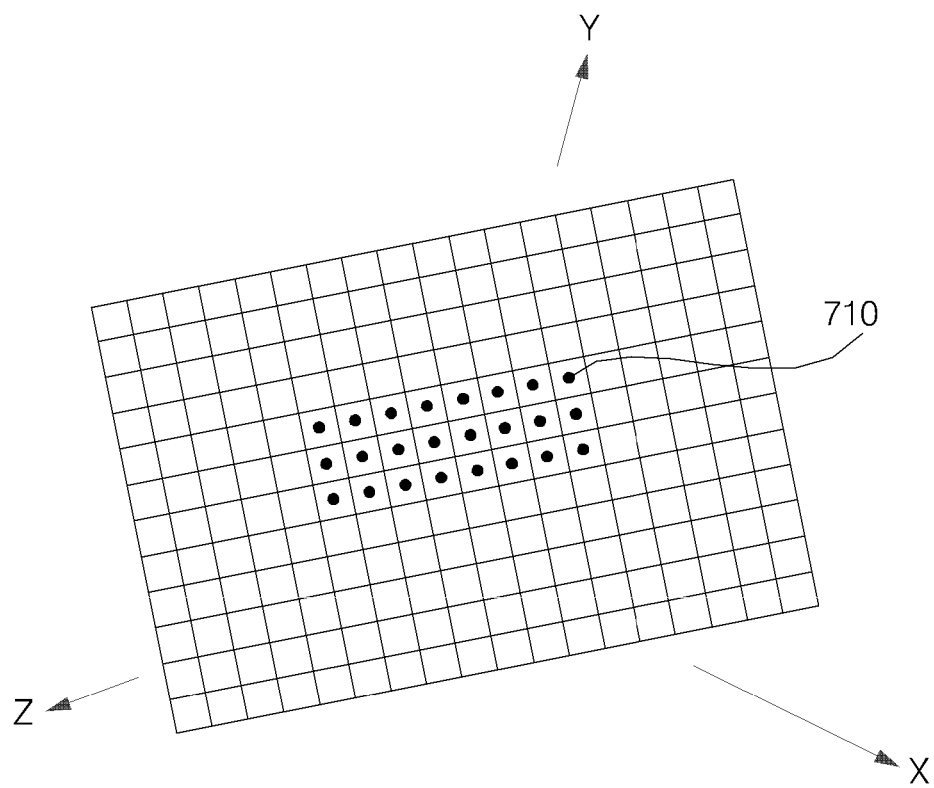
FIG. 10 is a view illustrating mapping based on location information acquired by the image sensor of FIGS. 9A, 9B, and 9C.

FIGS. 9A, 9B, and 9C are views illustrating three exemplary spot distributions formed on an image sensor of a location sensor. FIG. 10 is a view illustrating three-dimensional mapping based on location information acquired by the image sensor of FIGS. 9A, 9B, and 9C.

Referring to FIGS. 9A, 9B, and 9C, on a matrix of m×n indicating the location of spots 710 formed on the image sensor 220, the row corresponds to the rotational angle ω of the base 23, and the column corresponds to the rise height H of the elevation drive unit 50. The respective pixels of the image sensor 220 indicate the obstacle distribution situation in the cleaning area.

The location information of the respective pixels constituting the image sensor 220 may include distances from obstacles corresponding to each pixel as well as coordinates on the matrix. Accordingly, the three-dimensional location information of the obstacles corresponding to the respective pixels can be acquired by the location information of the respective pixels.

While the base 23 rotates by one cycle, the spots 710 formed on the image sensor 220 may be indicated in the same row. Accordingly, each column of the spot coordinates in the matrix may correspond to the rotational angle w of the base 23.

The rotation of the base 23 may be considered as turning within a certain range, or may be considered as 360 degrees or more rotation. For example, the rotation drive unit 40 may continuously rotate the base 23 in one direction. In this case, when the location sensor 20 is at the retracted location (see FIG. 6A), since spots 710 are formed on the image sensor 220 only when light emitted from the light transmitting unit 21 passes through the transparent member 32, the location information used for the mapping of the cleaning area may be obtained from a section corresponding to the profile of the transparent member 32, for example, section between 0 degree to 180 degrees.

When the base 23 is at the second location, particularly, upwardly protruded from the main body 10, the controller 90 may control the rotation drive unit 40 such that the base 23 rotates at least 360 degrees in one embodiment. Here, the obstacle situation of the 360 degree full range around the robot cleaner 1 can be scanned.

Also, the height of the base 23 may vary with the operation of the elevation drive unit 50, that is, the elevation drive unit may operate in several heights, and the base 23 may be rotated by the rotation drive unit 40 at each height. Accordingly, each row of the spot coordinates on the matrix may correspond to the height H of the base 23 at which the elevation drive unit 50 has elevated the base 23.

In this regard, spots 710 are distributed over three rows in FIG. 9A. The spots 710 in each row may be spots formed on the image sensor 220 at three different heights at which the base 23 is elevated by the operation of the elevation drive unit 50. For example, FIG. 9A shows the arrangement of the spots 710 when obstacles exist at the upper and lower part within the cleaning area.

Similarly, FIGS. 9B and 9C show a scan result of the cleaning area when the base 23 is allowed to retract and/or protract by the operation of the elevation drive unit 50 and then is rotated by the rotation drive unit 40. FIG. 9B shows a situation where obstacles are mainly distributed at the lower part in the cleaning area compared to FIG. 9A, and FIG. 9C shows a situation where obstacles are mainly distributed at the upper part in the cleaning area compared to FIG. 9A.

In other words, the location sensor 20 according to an embodiment of the present invention can scan the cleaning area while elevating and rotating with respect to the main body 10. In this case, the coordinates of the spots 710 formed on the image sensor 220 may correspond to the retracted & protracted height H of the base 23 in row, and may correspond to the rotational angle ω of the base 23 in column. Accordingly, the controller 90 can three-dimensionally map the obstacle distribution situation in the cleaning area from the coordinates of the spots 710 and the distances from the obstacles corresponding to each spot 710 in accordance with Equation (1) described above. Hereinafter, the height H of an obstacle, rotational angle ω, and the object distance L corresponding to each spot 710 will be referred to as location information.

Referring to FIG. 10, the controller 90 can map the obstacle distribution situation in the cleaning area, based on the location information. FIG. 10 shows mapping of the coordinate [ω, ω2, L] of each pixel on X-Y-Z space, and three-dimensionally shows the obstacle situation in the cleaning area. As shown in FIG. 10, since the location on Z-axis is assigned according to the object distance L corresponding to each pixel, it can be shown that X-Y plane where pixels are located is distorted in the Z-axis direction.

The base 23 may vertically move according to the operation of the elevation drive unit 50. Hereinafter, the condition where the base 23 retracts to is defined as a first location, and the condition where the base 23 protracts to is defined as a second location. Here, it should be noted that the location of the base 23 is not necessarily limited to the two locations.

That is, the first location and the second location need to be construed as relative to each other. The operation of the elevation drive unit 50 may be controlled such that location of the base 23 can be subdivided between the lowest retracted location and the highest protracted location, enabling the sensing of obstacles at each location between the lowest retracted location and the highest protracted location.

As described above, FIGS. 9A, 9B, 9C, and 10 show the distribution of the spot 710 when ranges covering three or more rows are scanned. This means that the obstacles are sensed at three or more locations where the heights of the base 23 are different from each other.

The base 23 may be housed in the main body 10 at a first location. In this case, light emitted from the light source 210 may travel toward obstacles through the front side of the main body 10. As described above, the main body 10 may have an opening at the front side thereof to allow light emitted from the light source 210 to pass through. According to embodiments, the opening may be provided with a transparent member 32 that passes the light. Light emitted to obstacle at the first location may travel in a substantially horizontal direction.

When the base 23 is at the second location, light emitted from the light source 210 may travel toward obstacles from the upper side of the main body 10. The traveling direction of light may be substantially parallel to the traveling direction at the first location. Accordingly, since obstacles sensed by light emitted when the base 23 is at the second location are at higher locations than those sensed at the first location, three-dimensional obstacle information for the cleaning area may be obtained.

More specifically, the controller 90 may perform at least one of a first obstacle sensing control of rotating the base 23 by controlling the rotation drive unit 40 at the first location and a second obstacle sensing control of rotating the base 23 by controlling the rotation drive unit 40 after raising the base 23 to the second location by controlling the elevation drive unit 50. The first obstacle sensing control may be to sense the location of obstacles distributed at a relatively lower location in the cleaning area, and the second obstacle sensing control may be to sense the location of obstacles distributed at a relatively higher location than the first obstacle sensing control. Regarding the same obstacle, the location information acquired by the first obstacle sensing control and the location information acquired by the second obstacle sensing control may include information regarding the same obstacle on a plane. In this case, however, according to the height of an obstacle to be sensed, the location information acquired by the second obstacle sensing control may indicate that the obstacle exists at a certain location on the plane while the location information acquired by the first obstacle sensing control indicates that the obstacle does not exist at a certain location on the plane. For example, this may be a case where a certain space (not sensed at the first location) exists under a bed frame (obstacle sensed at the second location) supporting a bed.

The controller 90 may control the traveling driving unit 60 based on the obstacle situation in the cleaning area, i.e., ambient obstacle situation acquired by the mapping or the location information acquired by the image sensor 220.

FIG. 9A illustrates the height of an obstacle higher than a certain height. In this case, the controller 90 may control the traveling drive unit 60 so as to avoid the obstacle (hereinafter, referred to as 'avoidance traveling'), which corresponds to a case where the height of the obstacle is too high for the robot cleaner 1 to cross the obstacle.

FIG. 9B illustrates the height of an obstacle lower than a certain height. In this case, the controller 90 may control the traveling drive unit 60 so as to cross the obstacle (hereinafter, referred to as 'cross traveling').

FIG. 9C assumes a situation where an obstacle does not exist at a lower part of the space to be cleaned even though an obstacle is sensed at an upper part thereof (e.g., bed). The controller 90 may control the traveling drive unit 60 such that the robot cleaner 1 passes the space when the space under the obstacle is sufficiently large for the main body 10 to pass (hereinafter, referred to as 'passing traveling'). When the space is small for the main body 10 to pass, the controller 90 may control the traveling drive unit 60 to perform the avoidance traveling. During the passing traveling, the controller 90 may control the elevation drive unit 50 such that the base 23 is housed in the main body to avoid the interference by the upper obstacle.

Figure 11:
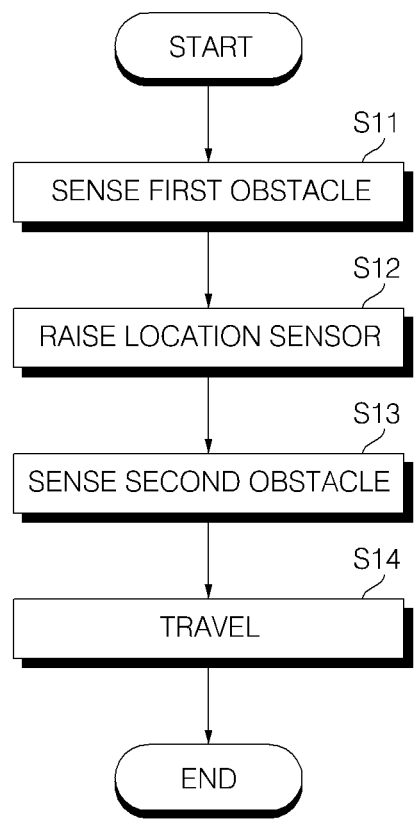
FIG. 11 is a flowchart illustrating a method of controlling a robot cleaner according to an embodiment of the present invention.

FIG. 11 is a flowchart illustrating a method of controlling a robot cleaner according to an embodiment of the present invention. Referring to FIG. 11, the controller 90 may sense the location of obstacles by controlling the rotation drive unit 40 such that the base 23 is rotated while being at the first location (first obstacle sensing; S11). If an obstacle is sensed upon first obstacle sensing, the controller 90 may control the elevation drive unit 50 such that the base 23 rises to the second location (rising of location sensor; S12), and may re-sense the location of the obstacle by controlling the rotation drive unit 40 such that the base 23 is rotated at the second location (second obstacle sensing; S13). Thereafter, the controller 90 may map the obstacle situation in the cleaning area based on the obstacle sensing results at the first and second locations, and may perform traveling of the robot cleaner 1 based on the mapping result (traveling; S14).

The traveling in operation S14, as described with reference to FIGS. 9A, 9B, and 9C, may include avoidance traveling, overcoming traveling, and passing traveling according to the obstacle situation.

Figure 12:
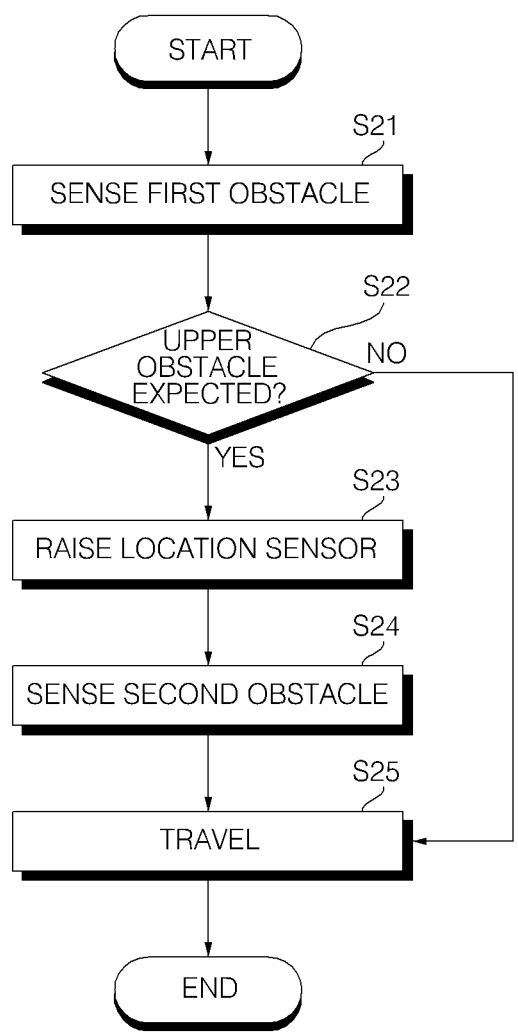
FIG. 12 is a flowchart illustrating a method of controlling a robot cleaner according to another embodiment of the present invention.
Figure 13A:
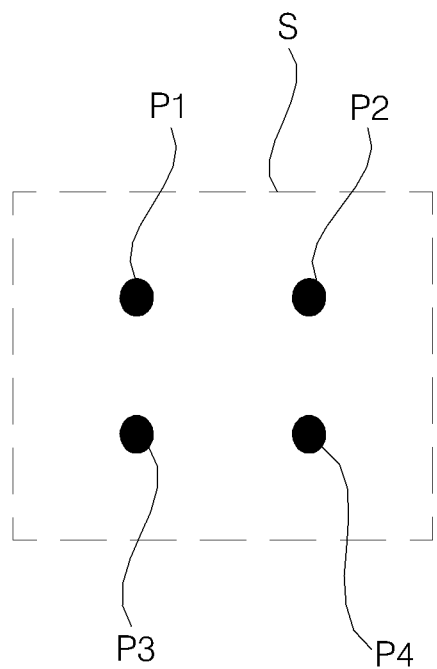
FIGS. 13A and 13B are views illustrating two exemplary obstacle situations sensed within a cleaning area.
Figure 13B:
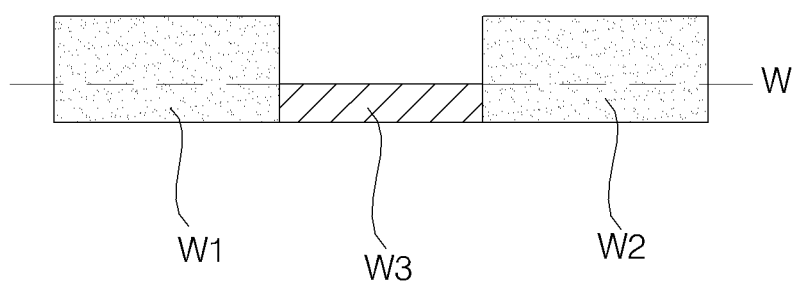

FIG. 12 is a flowchart illustrating a method of controlling a robot cleaner according to another embodiment of the present invention. FIGS. 13A and 13B are views illustrating two exemplary obstacle situations sensed within a cleaning area. Referring to FIGS. 12 and 13A, and 13B, the controller 90 may sense the location of obstacles by controlling the rotation drive unit 40 such that the base 23 is rotated while being at the first location (first obstacle sensing; S21).

First, two situations of FIGS. 9A and 9B can be assumed as examples in which an obstacle exists within a range sensed by the first obstacle sensing.

FIG. 13A illustrates a case where four or more obstacles P1, P2, P3 and P4 are sensed to be distributed in a certain range S through an ambient obstacle situation mapped by the first obstacle sensing. This may mainly occur in a case where furniture such as desk, chair, table, and bed supported by four or legs exist within the cleaning area. This sensing result may correspond to a case where an upper obstacle (e.g., bed frame supporting the mattress) is expected to exist ('Yes' of S22). The controller 90 may control the elevation drive unit 50 such that the base 23 rises to the second location (raising location sensor; S23), and then may control the rotation drive unit 40 such that the base 23 is rotated at the second location to re-sense the location of the obstacle (second obstacle sensing; S24).

Thereafter, the controller 90 may map the obstacle situation in the cleaning area based on the obstacle sensing results at the first and second locations and may perform traveling of the robot cleaner 1 based on the mapping result (traveling; S25). As described with reference to FIGS. 9A, 9B, and 9C, the traveling in operation S25 may include avoidance traveling, cross traveling, and passing traveling according to the obstacle situation.

In FIG. 13B, based on the ambient obstacle situation mapped by the first obstacle sensing (S21) and the second obstacle sensing (S24), when two straight line components W1 and W2 that are spaced from each other at a certain interval on the same line W are detected, the controller 90 may control the traveling drive unit 60 according to the height of a section W3 between the two straight line components W1 and W2. FIG. 13B corresponds to a case where a door between walls is opened. The two straight line components W1 and W2 correspond to the walls, and the section W3 between the two straight line components W1 and W2 corresponds to a threshold. In this case, the controller 90 may control the traveling drive unit 60 according to the height of the threshold. That is, when there is no threshold or the height of the threshold is low enough to cross the threshold, the controller 90 may control the traveling drive unit 60 so as to perform the passing traveling or the cross traveling, and otherwise, the controller 90 may control the traveling drive unit 60 so as to perform the avoidance traveling.

Meanwhile, referring to FIG. 1, the robot cleaner 1 may further include an upward distance sensor 110 that is disposed on the upper part of the main body 10, and may emit light upward from the upper side of the main body 10 to measure a distance from an obstacle.

The upward distance sensor 110 may include a light-transmitting unit 111 disposed on the upper part of the main body 10 at a certain interval and a light-receiving unit 112 to receive light reflected or scattered by obstacles. As described with reference to FIG. 8, the upward distance sensor 110 may be implemented with a sensor measuring a distance from an object using a triangulation method or a sensor measuring a distance from an object according to the amount of light received on the light-receiving unit 112.

Hereinafter, a method of controlling the robot cleaner 1 in a case where an obstacle is sensed to exist within a certain distance over the main body 10 when the location sensor 20 protrudes from the main body 10 by a certain height. This assumption may consider a case where the robot cleaner 1 passes under a bed. In this case, the controller 50 may check an extra space under the bed based on the distance sensed by the upward distance sensor 110, and thus may control the height of the location sensor 20 by the control of the elevation drive unit 50.

That is, when the distance from the obstacle sensed by the upward distance sensor 110 is greater than a certain value, it is determined that there is an extra interval to allow the location sensor 20 to further rise. Accordingly, the controller 50 may control the elevation drive unit 50 such that the location sensor further rises, and may perform obstacle sensing while rotating the base 23 by again controlling the rotation drive unit 40 at a height where the location sensor 20 is placed. In this case, the maximum rising height of the location sensor 20 may be within the measurement distance sensed by the upward distance sensor 110.

Figure 14:
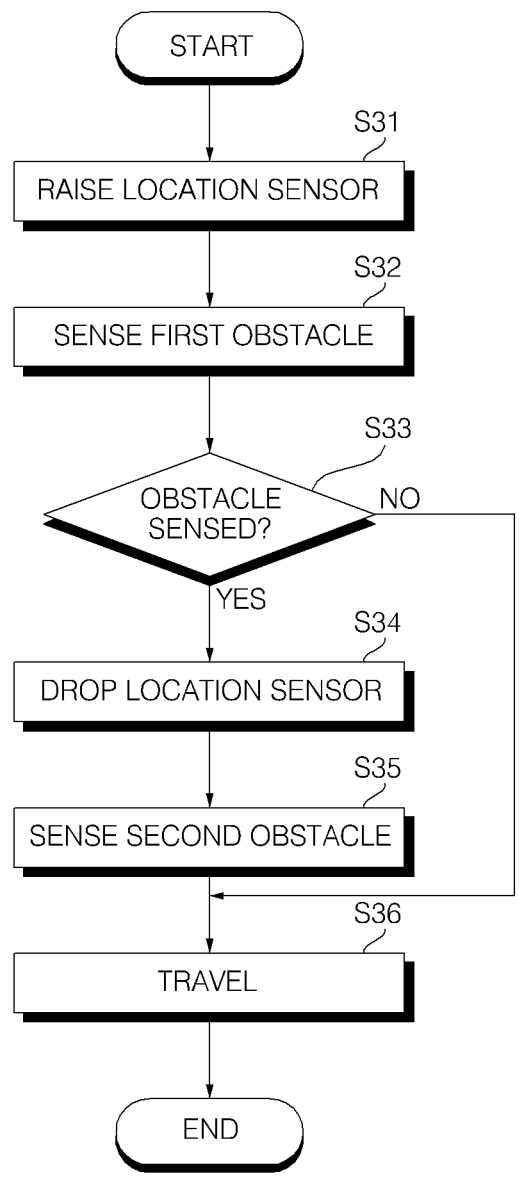
FIG. 14 is a flowchart illustrating a method of controlling a robot cleaner according to still another embodiment of the present invention.

FIG. 14 is a flowchart illustrating a method of controlling a robot cleaner according to still another embodiment of the present invention. Referring to FIG. 14, the robot cleaner 1 may sense and map the obstacle situation within the cleaning area before the traveling of the robot cleaner 1, and then may perform traveling based thereon.

The sensing and mapping of the obstacle situation may be first performed when the location sensor 20 upwardly protrudes from the main body 10 (see FIG. 6B). In this case, the height of the location sensor 20 may be adjusted according to the ambient obstacle situation that is sensed.

More specifically, the controller 90 may control the elevation drive unit 50 such that the location sensor 20 rises to a location (hereinafter, referred to as 'first location') where the main body 10 upwardly protrudes (S31).

Thereafter, the controller 90 may rotate the rotation drive unit 40 such that the location sensor 20 senses the location of obstacles while rotating at the first location. In this case, the base 23 may rotate 360 degrees or more, scanning the whole region around the robot cleaner 1 in terms of angle (first obstacle sensing; S32).

Upon first obstacle sensing, the rising height of the location sensor 20 may vary, and the ambient obstacle situation may be sensed by the rotation of the base 23 at each height. Thus, three-dimensional obstacle sensing can be performed in the vertical direction of the cleaning area (see FIGS. 9A, 9B, 9C, and 10).

When an obstacle is sensed by the first obstacle sensing of operation S32 ('Yes' of S33), there is an obstacle in the upper part of the cleaning area. Accordingly, the controller 90 may allow the location sensor 20 to be housed at the second location in the main body 10 by controlling the elevation drive unit 50 (S34).

Next, the controller 90 may perform the second obstacle sensing by controlling the rotation drive unit 40 such that the location sensor 20 rotates at the second location (S35). Upon second obstacle sensing (S35), the location sensor 20 may scan a limited range with respect to an area corresponding to the transparent member 32 or the opening at the front side of the main body 10, but the present invention is not limited thereto. For example, according to embodiments, the location sensor 20 may scan the whole region around the robot cleaner 1 while rotating in place through the driving control of the left wheel 61a and the right wheel 62a upon second obstacle sensing.

Also, based on the obstacle situation in the cleaning area obtained by the first obstacle sensing (S32) and/or the second obstacle sensing (S35), the controller 90 may control the traveling of the robot cleaner 1 (S36). That is, the controller 90 may control the traveling of the robot cleaner 1 based on the obstacle situation obtained from the first obstacle sensing (S32) in which the obstacle situation for the whole region around the robot cleaner 1 in terms of angle can be sensed, and in this case, when an obstacle is sensed by the first obstacle sensing (S32), the second obstacle sensing (S35) may be performed to again check whether or not there is a space for the robot cleaner 1 to pass under the sensed obstacle.

For example, when an obstacle is sensed by the first obstacle sensing (S32) ('Yes' of S33), and an obstacle is not sensed by the second obstacle sensing (S35) for a plane region occupied by the obstacle sensed by the first obstacle sensing (S32), it can be considered that there is an obstacle such as a bed having a certain space thereunder. In this case, the controller 90 may control the robot cleaner 1 to pass under the obstacle or clean the area under the obstacle.

The robot cleaner according to the embodiment of the present invention has an effect of accurately scanning the obstacle situation in the cleaning area. Particularly, the obstacle distribution situation in the cleaning area can be three-dimensionally scanned, and based thereon, appropriate avoidance or overcoming traveling for obstacles can be performed.

Also, the robot cleaner according to the embodiment of the present invention has an effect of accurately scanning the obstacle distribution situation in the cleaning area, as well as the distance from the obstacles.

A method of controlling a robot cleaner according to an embodiment of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
a main body;
a light transmitting unit that emits light;
an image sensor that senses light reflected or scattered by an obstacle from the light emitted from the light transmitting unit;
a base supporting the light transmitting unit and the image sensor and rotatably and vertically movably disposed in the main body;
a rotation drive unit that rotates the base; and
an elevation drive unit that allows the base to retract and protract from the main body,
wherein when the elevation drive unit locates the base at a first location, the light transmitting unit emits light to the obstacle through a front side of the main body, and when the elevation drive unit locates the base at a second location, the light transmitting unit emits light to the obstacle from an upper side of the main body.

2. The robot cleaner of claim 1, further comprising a controller to control at least one of the rotation drive unit and the elevation drive unit,
wherein the controller performs at least one of a first obstacle sensing control by controlling the rotation unit to rotate the base at the first location and a second obstacle sensing control by controlling the elevation drive unit to raise the base to the second location and controlling the rotation drive unit to rotate the base.

3. The robot cleaner of claim 2, wherein the controller controls the elevation drive unit to retract the base such that the base is housed in the main body when the obstacle is sensed by the controller through the second obstacle sensing control.

4. The robot cleaner of claim 2, further comprising a traveling drive unit to allow the main body to travel,
wherein after performing the first obstacle sensing control and the second obstacle sensing control, the controller can control the traveling drive unit such that the main body is capable of traveling.

5. The robot cleaner of claim 4, wherein the controller three-dimensionally maps an obstacle situation within an area to be cleaned based on a rotational angle of the base rotated by the rotation drive unit, a height raised by the elevation drive unit, and a distance from the obstacle, obtained from a location of a spot formed on the image sensor.

6. The robot cleaner of claim 5, wherein the controller controls the traveling drive unit such that the main body avoids, crosses, or passes the obstacle, based on the mapped obstacle situation.

7. The robot cleaner of claim 5, wherein the controller performs the second obstacle sensing control when a plurality of obstacles are sensed within an area sensed by the controller through the first obstacle sensing control.

8. The robot cleaner of claim 5, wherein when two straight line components spaced from each other at a certain interval on the same line are sensed by the controller through the first obstacle sensing control, the controller controls the traveling drive unit so as to travel avoiding, crossing, or passing between the two straight line components according to a height of a section between the two straight line components.

9. The robot cleaner of claim 1, wherein the rotation drive unit turns the base within a certain angle range, 360 degrees, or more than 360 degrees.

10. The robot cleaner of claim 1, wherein the light transmitting unit comprises a laser diode emitting a laser beam.

11. A robot cleaner of comprising:
a main body;
a light transmitting unit that emits light;
an image sensor that senses light reflected or scattered by an obstacle from the light emitted from the light transmitting unit;
a base supporting the light transmitting unit and the image sensor and rotatably and vertically movably located in the main body;
a rotation drive unit that rotates the base; and
an elevation drive unit that allows the base to retract and protract from the main body, wherein the main body includes a transparent member to pass light emitted from the light transmitting unit when the elevation drive unit retracts the base into the main body.

12. The robot cleaner of claim 1, further comprising a light receiving lens, wherein the light receiving lens is between the image sensor and the obstacle, and
wherein a distance between the obstacle and the light receiving lens is defined as distance L, the distance L is determined by $$L = \frac{-fg}{p - f\tan\theta}$$

wherein f is a focal length, g is an interval between the light transmitting unit and the light receiving lens, θ is an angle between light emitted from the light transmitting unit and the main axis C of the light receiving lens orthogonal to a center of the light receiving lens, and p is a length from a center of the image sensor to a spot of the image sensor where light reflected or scattered by the obstacle is detected.

13. A robot cleaner comprising:
a main body;
a location sensor rotatably and vertically movably located in the main body to sense a location of an obstacle by emitting light to the obstacle;
a rotation drive unit to rotate the location sensor;
an elevation drive unit to allow the location sensor to rise and fall; and
a controller to control one of the rotation drive unit and the elevation drive unit,
wherein the location sensor varies in emitting direction of light according to a rotation by the rotation drive unit, and
wherein the controller performs a first obstacle sensing control to sense a lower obstacle by controlling the rotation drive unit at a first location, and when an obstacle is sensed by the controller through the first obstacle sensing control, the controller controls the elevation drive unit such that the location sensor is located at a second location where the location sensor upwardly protrudes from the main body and the controller performs a second obstacle sensing control to sense an upper obstacle by controlling the rotation drive unit.

14. The robot cleaner of claim 13, wherein the controller performs the second obstacle sensing control when a plurality of obstacles are sensed through the first obstacle sensing control.

15. The robot cleaner of claim 13, wherein when the controller does not sense the lower obstacle through the first obstacle sensing control and the controller senses the upper obstacle through the second obstacle sensing control, the controller controls the elevation drive unit such that the base is located at the first location.

16. The robot cleaner of claim 13, further comprising an upward distance sensor to emit light upward from an upper side of the main body and to receive light reflected or scattered by the obstacle that exists at the upper side of the main body.

17. The robot cleaner of claim 16, further comprising a controller to control one of the rotation drive unit and the elevation drive unit,
wherein when the controller senses the obstacle at the upper side of the main body through the upward distance sensor while the location sensor is raised from the upper side of the main body, the controller controls the elevation drive unit such that a height of the location sensor is adjusted within a range that does not exceed a distance between the obstacle and the upper side of the main body.

18. A robot cleaner comprising:
a main body;
a location sensor rotatably and vertically movably located in the main body to sense a location of an obstacle by emitting light to the obstacle;
a rotation drive unit to rotate the location sensor;
an elevation drive unit to allow the location sensor to rise and fall; and
a controller to control one of the rotation drive unit and the elevation drive unit,
wherein the controller performs first obstacle sensing by controlling the rotation drive unit such that the location sensor rotates at a first location where the location sensor is raised from an upper side of the main body, and when an obstacle is sensed by the first obstacle sensing, the controller controls the elevation drive unit such that the location sensor falls to a second location where the location sensor is housed in the main body.

19. The robot cleaner of claim 18, wherein the controller performs second obstacle sensing by controlling the rotation drive unit such that the location sensor rotates at the second location.

20. The robot cleaner of claim 19, further comprising a traveling drive unit to allow the main body to travel,
wherein when the controller senses the obstacle through the first obstacle sensing and the controller does not sense the obstacle in a plane region occupied by the obstacle through the second obstacle sensing, the controller controls the traveling drive unit such that the main body enters the region occupied by the obstacle sensed by the first obstacle sensing.

21. The robot cleaner of claim 19, further comprising a transparent member or an opening at a front side of the main body through which light emitted from the location sensor passes through when the controller performs the second obstacle sensing.

22. The robot cleaner of claim 18, wherein the first obstacle sensing comprises 360-degree obstacle sensing around the main body.

* * * * *